Figure 1:
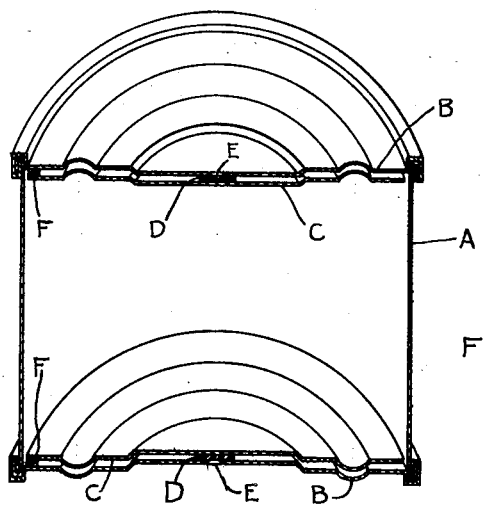

Sept. 1, 1931. L. A. ROGERS 1,821,447
CAN FOR THE PRESERVATION OF CHEESE
Filed Sept. 16, 1929

Patented Sept. 1, 1931

1,821,447

UNITED STATES PATENT OFFICE

LORE A. ROGERS, OF WASHINGTON, DISTRICT OF COLUMBIA

CAN FOR THE PRESERVATION OF CHEESE

Application filed September 16, 1929. Serial No. 393,051.

(GRANTED UNDER THE ACT OF MARCH 3, 1883, AS AMENDED APRIL 30, 1928; 370 O. G. 757)

This application is made under the act approved April 30, 1928, and the invention herein described may be manufactured and used by or for the Government for governmental purposes without payment to me of any royalty thereon.

I hereby dedicate the invention herein described to the free use of the public, to take effect upon the granting of a patent to me.

When cheese of any type is sealed in tin cans, glass jars, or other airtight containers, two things may happen which would make the cheese unmarketable. First, if the can is not completely filled so that an appreciable amount of air is available or if the seal is not perfect so that air passes into the container the cheese will mold. Second, cheese in its normal ripening forms a variable amount of gas, largely carbon dioxide, and sooner or later sufficient pressure will be formed to produce swelling and sometimes even bursting the can.

The first difficulty can be overcome by taking advantage of the fact that molds are strictly aerobic and grow only in an atmosphere containing a considerable percentage of oxygen.

If a container is filled so full of cheese that insufficient air is available, molds will not develop. It is not necessary under ordinary conditions to exhaust the air from the container and replace it with inert gas. The container may be filled with carbon dioxide which is heavier than air, the package of cheese placed in the container which is sealed at once.

In my experiments I have used ordinary cans of the so-called sanitary type. The cheese was cut into rectangular prints of a suitable size to fit the round can. In some cases these prints were wrapped with tinfoil, while in others the cheese was put in the cans without covering. This is immaterial to the success of the experiment and the wrapping is used only to make a more attractive package when the can is opened. Carbon dioxide was allowed to flow from a cylinder of compressed gas into the can until the air was entirely displaced. This can easily be determined by holding a lighted match in the top of the can. The block of cheese was then placed in the can, the top put on at once, and the can sealed. In some experiments the can was evacuated and then filled with carbon dioxide. This is probably not necessary except possibly in the case of wrapped cheese of the Swiss type in which it is not easy to displace the air in the eyes.

I am well aware that carbon dioxide and other inert gases have been used to preserve foods sealed in cans but so far as I know it has never been used to prevent the growth of molds on cheese.

The difficulty of swelling due to the formation of gas in the normal ripening of the cheese I propose to obviate by providing the container with a valve which will permit the escape of excess gas but which will prevent the ingress of air to the container. In the valve which I use the top or bottom of the can, as the case may be, forms an integral part of the valve. It consists of a disc of metal fitting the end of the can and holding a seal of rubber or other suitable material against a small opening in the end of the can. This metal disc is held in place by soldering it to the end of the can at two or more points but not in such a way that the flow of gas between the disc and the end of the can will be prevented. Before sufficient gas is produced to cause an appreciable swelling of the can the valve will open and the gas escape. Pressure from without holds the opening firmly against the seal and prevents the entry of air.

In my previous application I proposed to hold the disc in place by the pressure of the cheese. This was found to have certain disadvantages. Pressure on the cheese, especially at relatively high temperatures tends to force fat and whey out of the cheese which makes an objectionable package. By the use of this improved form of valve, any type of cheese may be cut into a convenient package and sealed in a metal or glass container with metal top. Cheese of the Cheddar type may be pressed or cut in any desired form and ripened in the container without waste or loss of moisture.

Figure 2:
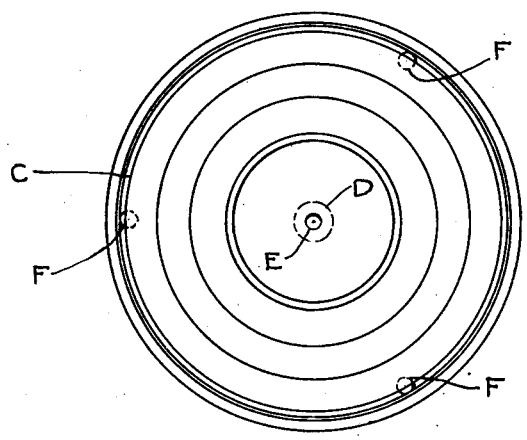

The construction of the valve is shown in the accompanying drawings in which Fig. 1 represents a side elevation of the can, partly in section; and Fig. 2 shows a top plan view of the can.

In these drawings B is the top of a can A in which there is a round opening E. A rubber seat D is held against the opening E by a circular disc C which is held in place by drops of solder or other suitable means as at F.

When sufficient pressure is created in the can to cause a curvature in top B the gas passes betwen B and C and escapes through the opening E. When the pressure is relieved the top B resumes its normal shape and presses against the seat E with sufficient force to prevent the seepage of air into the container.

I claim:

A can for preserving cheese comprising sides and end members, the end members having aperatures in their central portions, plates conforming to the shape of said end members affixed inside the can in close proximity to the end members, closure members for the apertures in the end members attached to said plates adapted to prevent the ingress of air into and to permit the egress of excess gas from said can.

LORE A. ROGERS.